March 1, 1966 M. J. FRANKLIN 3,237,954
PIPE JOINT OF SYNTHETIC PLASTIC CONCRETE
Filed June 27, 1963 3 Sheets-Sheet 3

INVENTOR.
MATTHEW JAMES FRANKLIN
BY
Beehler & Shanahan
ATTORNEYS

United States Patent Office 3,237,954
Patented Mar. 1, 1966

3,237,954
PIPE JOINT OF SYNTHETIC PLASTIC CONCRETE
Matthew James Franklin, Shafter, Calif., assignor to Cen-Vi-Ro Corporation, Shafter, Calif., a corporation of Delaware
Filed June 27, 1963, Ser. No. 291,058
8 Claims. (Cl. 277—237)

This is a continuation-in-part of copending application Serial No. 184,907 filed March 16, 1962, now abandoned.

The invention relates to pipe joints and has special reference to a molded end member of synthetic plastic concrete material mounted upon one or both ends of a concrete or steel pipe in such fashion that the molded end member becomes an integral portion of the pipe and is made use of in joining lengths of pipe together when they are laid end to end in the customary fashion.

More particularly, the invention relates to an article and a means for making the same which consists of mixing together in a distinct manner dry aggregate which may be sand or gravel or a mixture of the two with a synthetic plastic material while the latter is still in liquid form and then molding the mixture into the form of a flange either separately or in place upon the exterior end of a length of concrete, steel or other pipe. The mixture chosen is one which sets up hard and bonds to the exterior of the pipe with a degree of adhesiveness comparable to the bond which holds the material itself together and which after the mold has been stripped presents a relatively smooth exterior surface held to an extremely workable degree of tolerance and which furthermore is relatively non-brittle so that the pipe with its molded end can be very readily handled both during the manufacturing process and later when shipped to and laid in the field.

The invention here under consideration is particularly well adapted to pipes of extra large diameter although not confined expressly thereto and finds a special field of use in molded concrete pipes, both nonprestressed and prestressed heretofore dependent upon joints which have been relatively time-consuming and expensive to construct on some occasions or on other occasions which have been of such character that many seconds and nonusable pipes result from faulty forming processes when the pipe is initially constructed. The invention here under consideration furthermore has unique and special advantages when used upon prestressed concrete pipes. When pipes are molded and then prestressed in a conventional fashion making use of bell and spigot ends molded from the concrete itself, it is not possible to bring the final turns of prestressing wire near enough to the ends of the pipe and particularly the spigot end. Consequently in pipes of this type heretofore constructed, it has not been possible to avoid a weakness at the spigot end which invariably results in a weakness at the joint of which the spigot end is part.

In recognition of the great advantage gained by bringing the prestress winding close to the spigot end of the prestressed concrete pipe attempts have been made to construct a joint using a flange of Portland cement mortar molded to the pipe and provided with an exterior annular recess for reception of a resilient gasket to seal with the bell end. Pipe joints of this kind have been found to be inadequate and unsuccessful, partly because of the inability to secure an adequate bond between the newly molded concrete flange and the exterior of the already formed pipe core. Further, because of the nature of Portland cement mortar, shrinkage resulting during cure creates cracks and fissures through the flange which are penetrated by liquid under the high pressures carried by pipe of this kind, causing excessive leaking. Moreover, although a dry mix produces the best concrete, because of the thinness of the flange section which must be molded, a dry mortar mix will not adequately fill the mold without extra reinforcing, to permit the removal of the mold without damage to the flange, even though a cure takes place first. On the other hand, wet mortar which fills the mold more easily gives rise to so much shrinkage, cracking, and weakness of structure that the resulting flange is of no practical value. Because of these and other defects, no pipes with flanges of this or of other plastic concrete have heretofore been made commercially available.

In other kinds of pipe, as for example, clay pipe, used in relatively small sizes for sewers, drainage, and gravity type installations, a softer plastisol joint material has been made available. Material of this nature, even when mixed with a substantial proportion of aggregate such as sand, is of a sufficiently yieldable nature to render it incapable of holding firm against even moderate internal fluid pressures. Where joints have been made of synthetic plastics of the plastisol type they have been found to leak so excessively when subjected to internal fluid pressure that use of such plastics for joints in high pressure pipe has been rejected.

An object of the invention is therefore to provide a new and improved synthetic plastic molded concrete mixture in the form of a pipe flange which when in place in a pipe joint will be impervious to leakage when subjected to internal fluid pressure, and which provides a structurally strong, hard and dependable pipe joint flange for a joint in pipe lines which carry fluids under pressure.

It is also among the objects of the invention to provide a new and improved end member of synthetic plastic concrete upon the end of a length of pipe constructed in such fashion that the end of synthetic plastic concrete becomes an integral portion of the pipe itself.

Another object of the invention is to provide a new and improved end structure for pipe which consists of molding upon the end of the pipe a synthetic plastic concrete band which is ultimately used as a part of the joint when two ends of pipe are joined together.

Still another object of the invention is to provide a new and improved joint which results from initially molding a flange of special configuration upon the spigot end of a length of pipe, the projection being of a material comprising a mixture of aggregate and a synthetic plastic material which becomes hard upon setting with a suitable catalyst, the projection which when advantageous being constructed with an annular recessed area receptive of a resilient sealing ring to further improve the construction of a joint made between such spigot end and a suitable bell end of comparable pipe.

Still further included among the objects of the invention is to provide a new and improved joint for molded concrete pipes and particularly prestressed concrete pipes which enables the prestresed wire to be wound virtually to the end face of the spigot end of the pipe and wherein the pipe wound in the fashion described has incorporated integrally with the spigot end a molded projection of synthetic plastic concrete material which becomes an integral portion of the pipe when completed and capable thereafter of being used in the laying of pipe in order to make the joint.

Another object of the invention is to provide a new and improved joint for concrete pipe wherein a flange of synthetic plastic concrete is premolded under carefully controlled conditions and subsequently fastened upon the end of the pipe with a compatible adhesive so as to virtually fuse the flange in place and at the same time to allow prestress winding to be brought to a location on the pipe sufficient to impart prestressed strength all the way to the pipe end.

Also included among the objects of the invention is to provide a new and improved end structure for concrete and other pipe and particularly specials in the nature of L's, T's, crosses, Y's, and the like of such nature that a projection can be molded in place upon the pipe either separately and then applied to the pipe end after the pipe has been formed thereby simplifying to an appreciable degree the initial molding of the respective piece while at the same time providing each piece with an end for joining purposes which is far superior to ends heretofore made up of the material of the pipe itself and, moreover, an end which when part of a joint inhibits leaks to a degree far superior to any heretofore devised.

With these and other objects in view, the invention consists in the construction, arrangement and combination of the various parts of the device whereby the objects contemplated are attained, as hereinafter set forth, pointed out in the appended claims and illustrated in the accompanying drawings.

In an embodiment of the invention chosen for the purpose of illustration the synthetic plastic concrete flange is shown attached to a molded prestressed concrete pipe as a typical example, inasmuch as this form of product is one wherein the joint has special advantages but at the same time requires a special technique in applying the material to the pipe in order that these advantages may be reailzed.

By way of example there is shown a molded concrete core 10 which is the type of concrete pipe made in sizes ranging all the way from eighteen to twenty inches in diameter up to eight feet or more in diameter, the length of such pipe being twenty feet or more and in some instances as long as forty feet. Although a straight pipe length is illustrated in the drawings, the same procedure is applicable to the same degree on pipe sections commonly termed "specials" which consist of Y's, T's, L's, cross-overs and in some instances arcuate of cambered lengths which may be used in negotiating a curve in the pipe line. Pipes of various cross-sectional shapes other than circular are also included.

Although the simple molded core 10 may be satisfactory for relatively low pressures, where higher pressures are to be handled, the core 10 is prestressed as shown by winding upon the exterior a length of prestressing wire 11 which is anchored at one end by employment of an anchor lug 12 and at the other end by employment of an anchor lug 13. In the example chosen the core is built with a bell end 14 and a spigot end 15. It is important to realize that the anchor lug 13 at the spigot end is carried to a location substantially flush with a transverse end face 16 of the spigot end so that a final turn 17 of the wire 11 is as near as possible to the end. Bringing the prestressed winding to the very end of the pipe as described has a very marked effect in improving the strength of the pipe. Unless the winding is brought to the end as shown, a weak spot is invariably present where the prestressing of the wire ceases, leaving only the strength of the concrete between the last turn of wire and the end of the pipe to supply the necessary strength for the pipe. In the ordinary type of pipe where a flange is molded at the spigot end from the pipe material itself, heretofore it has not been found possible to carry the prestressed winding any further than the edge of the flange.

At the spigot end there is provided a flange 18 molded upon an outside cylindrical surface 19 of the core. A protective coating 20 covers the balance of the cylindrical surface including the exterior of the bell end 14 in order to protect the wire 11 from deterioration when in use. The coating normally consists of a concrete grout which is spread upon the exterior by well-known methods such as throwing or spraying the grout upon the exterior while the pipe core is being rotated.

The flange 18 is of special composition and consists of a mixture comprising an aggregate of hard material such as sand, gravel, or a mixture of the two, and a synthetic thermosetting plastic of the type which hardens by employment of a catalyst or hardener. Synthetic plastic resins which have been found particularly acceptable are identified generally as any synthetic thermosetting plastic or resinous material of either the polymerizing or the condensation reaction type or any modification thereof. This also includes any liquid epoxy system which may be either a solvent system or solid system.

Among the polymers or polymerizing plastics in addition to the epoxies are urethanes and polyesters, the latter comprising styrenes, diallyl phthalates and het acids. The term "het acids" has been chosen as one describing a substance known chemically as "hexachloroendomethylene-tetrahydrophthalicanhydride." Among the condensation products are the phenolics, ureas, melamines, and furfurals, the latter being particularly useful for flanges on pipe which may be used in transporting liquids or gases containing acids.

The material of the flange 18 has heretofore been described as a synthetic plastic concrete, this term being chosen as a term of description or convenience as indicating the mixture of synthetic plastic resin and the aggregate which will be understood to consist of sand or gravel or a mixture of the two. The amount of voids present has considerable bearing upon the success of the joint but the amount of voids present may vary to a considerable degree depending upon the type of aggregate chosen. For some sands, the aggregate may contain voids comprising as little as ten percent by weight of the mass. When using standard fillers or diatomaceous earth, the voids may range as high as forty percent by weight. On the other hand should a silica sand be used wherein the individual particles are sharp and impervious to penetration by the plastic voids might even be as high as seventy percent by weight. In the event a coarse gravel is used, a filler is found advisable to minimize the voids in the interest not only of economy but in the interest of making certain that the unsupported span of the plastic material will be as low as possible. Although a fine aggregate wherein the percentage of voids is low will ordinarily produce a mass wherein the unsupported span of plastic is relatively short, nevertheless, there is a low limit below which the mixture after hardening will not be uniform and may contain portions untreated with the plastic which will weaken the flange and cause deterioration and crumbling. On the other hand, it is extremely important in providing a flange of the type herein described adapted for periods of service ranging into many years where extremely moist conditions are encountered to prepare the mixture in a manner so as to keep the after-shrink as low as possible thereby to minimize the development of cracks and fissures which may occur during after-shrink. In other words, the shorter the unsupported span of hardened plastic the less will be the degree of after-shrink.

Although diatomaceous earth has been referred to as a filler, other fillers such as calcium carbonates and sundry clays are also advantageous.

A filler such as milled asbestos fiber is especially advantageous in that it serves a multiple purpose, namely, that of filling the voids in the finer aggregate and at the same time providing fiber strands of linear configuration which become coated with the synthetic plastic resin and serve as a reinforcement.

In handling the liquid resinous material, any one of a number of standard catalysts or hardeners may be employed such as those commercially sold with the particular type of synthetic plastic chosen. Care, however, should be taken in the selection of a hardener having in mind the possibility of a toxic situation or a dermatitis problem which might occur in the handling of the material. Even more important in selecting the hardener and the quantity of hardener to be mixed with the plastic is the ambient temperature existing at the time of the molding. Although such a mixture can be controlled so as to harden at the usual room temperature or out of door temperature, it should be more borne in mind that during the summer months of the year in hot climates the mass of iron or other metal present in the mold or in the core or both is such that it can absorb a rather large amount of heat which should be taken into consideration for the accelerating effect it will have upon the hardening of the mixture. The hardening, of course, must be gaged so as to take place slow enough so that a complete filling of the mold will be accomplished before hardening takes place. To obviate a possible short pot life and the troublesome effects which might be experienced on some occasions, it may be advantageous to employ a heat cure type of the thermosetting plastic in which event after the pouring of the mold the pipe with the mold in place filled with the material may be passed through an oven of the type commonly employed for the curing of the concrete itself when cores are made in the usual conventional fashion.

In addition to the importance of having the synthetic plastic concrete dense and of substantial tensile and compressive strength, it is also important that there be a strong impervious bond within an area 25 where the flange makes contact with the cylindrical surface 19 of the core. Contributing to the effectiveness of the bond, both from the point of view of imperviousness and adhesiveness is the roughened character of the cylindrical surface and also the presence of loops of the wire 11. The aggregate, moreover, whether it be sand, gravel, or a mixture of the two is in such quantity that the aggregate itself finds its way into the spaces between the loops of wire, thereby adding materially to the ability of the bond to hold the flange in place on the core.

Core samples taken from pipe flanges made as above described have demonstrated that the bond between the synthetic plastic thermosetting concrete and the prestressing wire is so great that even after tension in the wire has been released by cutting pieces from the wire, the wire does not pull loose from the flange section and the flange section is preserved tightly bonded to the pipe.

Figure 1:
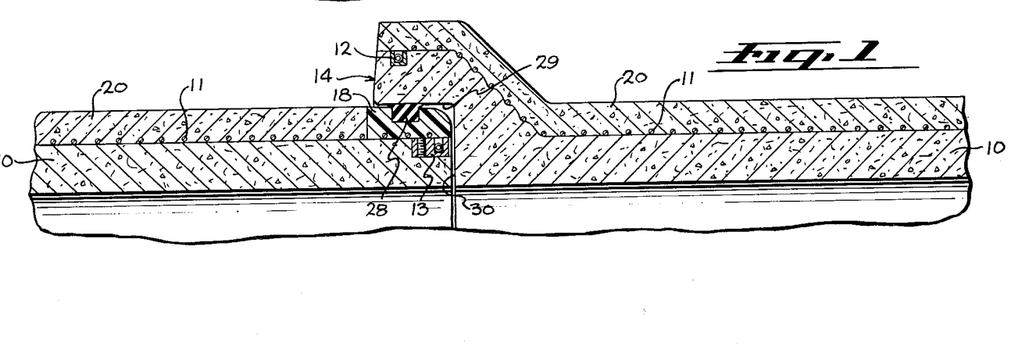
FIGURE 1 is a fragmentary longitudinal section of a fully made up pipe joint showing one form of the device.

In making use of the flange 18 to form a joint such as that shown in FIGURE 1, there is provided an annular recess 26 in the outside surface 27 of the flange in which is located an annular sealing ring 28 of resilient material which can be natural or synthetic rubber or some appropriate flexible synthetic plastic. It should be noted further that the surface 27 is pitched at a slight angle inwardly toward the end of the core upon which the flange is mounted, or that a surface 27' may be stepped down relative to the surface 27 to get a similar effect.

In making up the joint it will be seen that the bell end 14 is provided with a recess 29 at the inner end of which is a shoulder 30. The diameter of the recess 29 coincident with the inside cylindrical surface of the recess is slightly greater than the outside diameter of the flange 18 so that there remains a slight working clearance between the two when the joint is made up as illustrated in FIGURE 1. It is significant also that the breadth of the flange is somewhat comparable to the depth of the recess and that the sealing ring 28 lies well within the outside end of the recess and is pressed into contact with the inner cylindrical surface so that the pressure deforms the sealing ring to a degree and makes a fluid-tight joint resistant to leakage under considerable pressure. It is desirable further to have the necessary pressure contact take place at a location such that a clearance remains between the shoulder 30 and the end face 16 of the spigot end of the pipe core.

Although the area 25 is exposed to whatever pressure is present in the interior of the pipe, the bond formed between the synthetic plastic concrete 18 and the cylindrical wall of the pipe core is sufficiently impervious to penetration of liquids under pressure to resist such penetration and prevent any corrosion or deterioration of the wire 11. Good practice suggests further that the anchor lug 13 be located slightly inwardly with respect to the end face 16 so that when the flange 18 is applied, a portion of the synthetic plastic resin material will coat the exposed portion of the lug and seal it off from contact with any liquid which might be contained within the pipes. The offset relationship providing for this sealing need be no more than a fraction of an inch and this will in no way affect the additional strength built into the pipe core by having the endmost turns of the wire 11 as near as possible to the spigot end of the pipe.

Figures 2, 3, 5:
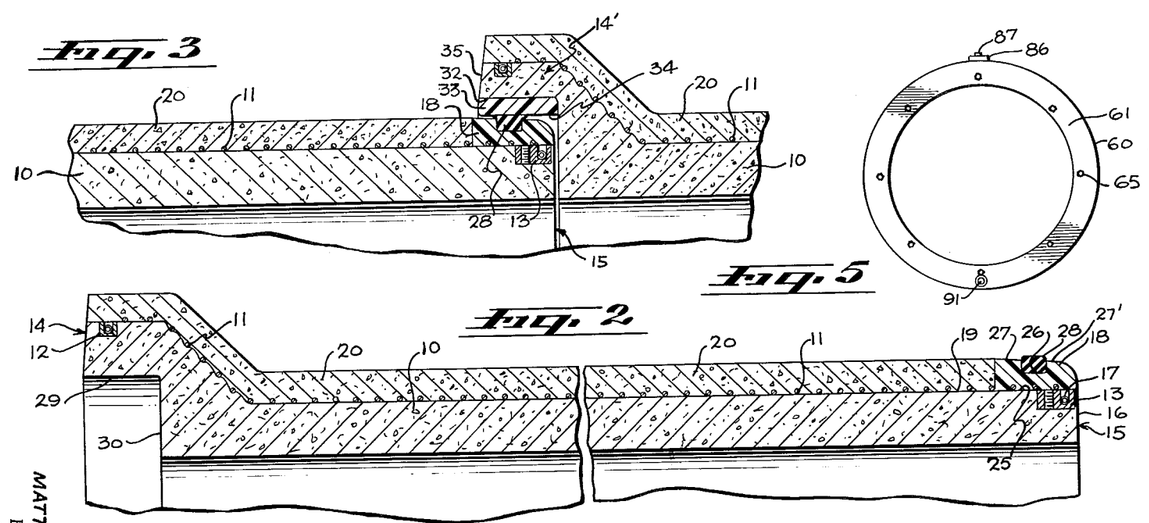
FIGURE 2 is a longitudinal sectional foreshortened view showing both ends of one of the pipes used in FIGURE 1.
FIGURE 3 is a fragmentary longitudinal sectional view of a second form of the joint.
FIGURE 5 is an end view taken on the line 5—5 of FIGURE 4.

On some occasions it may also be desirable to have the inner portion of a bell end recess 32 of a second form of the device illustrated in FIGURE 3 provided with a band 33 of the same synthetic plastic concrete as is used in forming the flange 18. If this construction is employed, an inside surface 34 of the band is made of such diameter as to provide a slight clearance between itself and the exterior surface 27 of the flange so that there is opportunity for the sealing ring 28 to spread slightly when the pipe joint is made up, as illustrated in FIGURE 3. The band preferably extends slightly beyond an end face 35 of the bell end 14' so as to offer a degree of protection against chipping when the pipe is shipped as well as when the joint is being made up.

Figures 4, 4A, 6, 7, 8, 9:
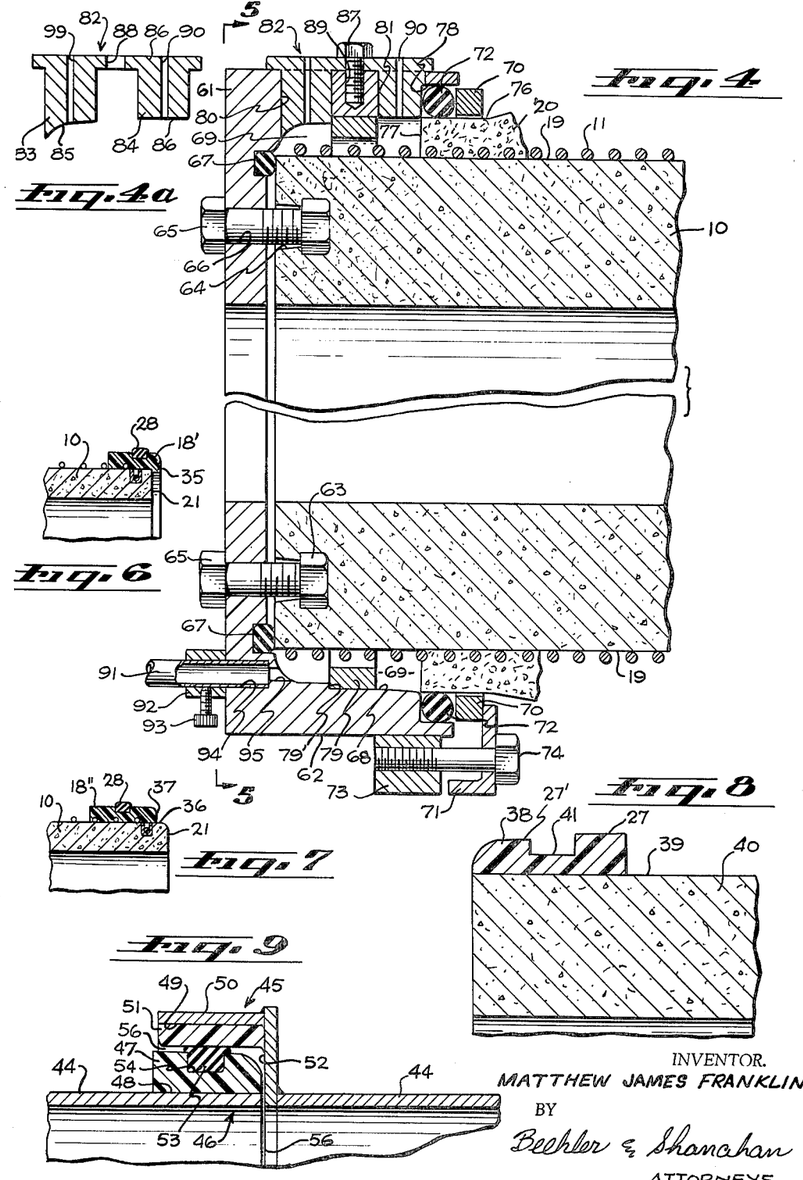
FIGURE 4 is a longitudinal sectional view of a mold in place on the end of a pipe ready for the pouring of the synthetic plastic concrete flange.
FIGURE 4a is a fragmentary longitudinal sectional view of a venting insert for the mold.
FIGURES 6 and 7 are fragmentary longitudinal sectional views of a spigot end of prestressed pipe with the flange displaced slightly from a purely flush end construction.
FIGURE 8 is a fragmentary longitudinal sectional view of a spigot end of a nonprestressed concrete pipe with the flange in place.
FIGURE 9 is a fragmentary longitudinal sectional view of still another form of the device applied to all metal pipe sections.

Although in the more common form of the invention the flange 18 extends flush with respect to an end face 21 of the core, special occasions may prompt altering the location of the flange somewhat in the manner shown in FIGURES 6 and 7. In FIGURE 6, for example, a flange 18' has an overlapping shoulder 35 extending outwardly beyond the end face 21 a short distance and preferably extending also for a short distance over the end face. In other respects the general construction and attachment of the flange is the same as previously described.

In FIGURE 7 a flange 18'' is shifted inwardly with respect to the end face 21, leaving a narrow unoccupied land 36 exposed beyond an end edge 37 of the flange.

In FIGURE 8 a substantially similar flange 38 is employed attached directly to an exterior cylindrical surface 39 of a molded concrete pipe core 40 which is used without employment of the prestressing wire 11. In this form of the device the synthetic plastic concrete mixture is molded upon the cylindrical surface 39 so as to establish a bond having a high degree of adhesiveness as well as presenting an impervious joint between the two materials. Here again there is provided an annular recess 41 for reception of a sealing ring in the same manner as has already been described.

The joint employing the synthetic plastic concrete material may also be used where steel pipes are employed as illustrated in FIGURE 9. In this instance a steel pipe 44 has a bell end 45 and a spigot end 46. On the spigot end is a flange 47 of the same synthetic plastic concrete molded upon the steel pipe so as to form an impervious bond between itself and the pipe. In instances of this kind it is found advantageous to sand blast the surface of the steel pipe to produce a degree of roughness within an area 48 at the end so as to improve the bond. It is helpful also to similarly sand blast and area 49 forming the inside surface of a band 50 which forms the bell end so that when an interior band 51 of synthetic plastic concrete is molded therein, there will be an adequate bond between the material. The interior band 51 extends inwardly into engagement with a shoulder 52 of the bell end 45. A seal ring 53 is contained in an annular recess 54 in the same manner as heretofore described, there being provided a clearance 56 between the flange and the interior band so that the seal ring can spread sufficiently in making a liquid-tight joint. In making the joint there is also a clearance 56 provided between the shoulder 52 and the endmost portion of the spigot end to permit some degree of flexure at the joint.

In order to effectively mold a flange upon a pipe, some molding apparatus need be employed. An example of such a molding apparatus is illustrated in FIGURES 4 and 5 where the apparatus is applied to the molding of a flange upon the spigot end of the core 10, thereby to illustrate the type of apparatus which can be depended upon and the manner of application to a core.

As shown, there is employed a mold 60 which is substantially annular in its general form, as illustrated in part in FIGURE 5, and which consists of a transverse flange 61 and a circumferential flange 62 jointed together in a substantially right angle relationship as shown in FIGURE 4. In order to secure the mold in position, nuts 63 may be cast in the end of the core 10 when the core is initially molded and holes 64 may at the same time be formed by use of an appropriately temporary plug or core. Bolts 65 extend through suitable apertures 66 in the transverse flange and screw into the nuts 63. A packing ring 67 is employed between the inside face of the transverse flange and the end of the pipe core so as to seal this area. An inside surface 68 of the circumferential flange 62 is spaced a substantial distance from the cylindrical surface 19 of the core so as to provide a mold chamber 69. The surface 68 may be provided with a draw, if the mold is a continuous annular element in order that the mold may be readily removed after the molding operation has been completed.

To close the chamber there is employed a mold closing ring 70 of annular shape which is held in position by employment of holding clamps 71 and beneath which is a band 72 of some material such as silicon rubber. The closing ring may be a split ring to facilitate removal. The clamps are fastened to brackets 73 by use of bolts 74. It has been found advantageous to first apply the coating 20 over the core 10 and the prestress wire 11 so that a cylindrical exterior 76 of the coating is engaged by the band 72 and an end face 77 forms one of the walls of the chamber 69. The band 72 is contained in an annular pocket 78 and is pressed by closing ring 70 into sealing relationship with the cylindrical exterior thereby closing that side of the mold chamber 69.

In order to form the annular recess 26, a split insert ring 79 is supplied which is forced against a step 79' which holds it in place. The inside surface of the insert ring is spaced a substantial distance from the turns of wire 11 so that there will be an appreciable quantity of the synthetic plastic concrete material beneath the annular recess 18 which is ultimately formed by reason of the presence of the insert ring.

Initially holes 80 and 81 are entirely open in order that they may be used for the admission of the aggregate to the mold chamber 69. The holes 80 and 81 are substantially larger in diameter than the maximum size of aggregate particles so that the aggregate can be quickly and easily poured into the mold chamber. To facilitate distributing the aggregate evenly throughout the entire circumference of the mold chamber, the mold may be shaken, rattled or vibrated during the pouring of the aggregate so that it will be compacted to the desired degree. After the aggregate has been placed in the manner described, a fixture 82 which fits into the holes 80 and 81 is applied. The fixture is shown in cross-sectional view, as previously noted in FIGURE 4a. Projections 83 and 84, respectively, fit into the holes 80 and 81 and inside surfaces 85 and 86 of the projections coincide precisely with the inside surface 68 of the circumferential flange. A plate 86 upon which the projections are mounted and form a part overlies the exterior of the circumferential flange and may be bolted thereto by means of a bolt 87 extending through a hole 88 in the plate into a threaded opening 89 of the circumferential flange. Vent holes 99 in the projection 83 and 90 in the projection 84 serve to vent air from the mold chamber as the mold chamber is being filled.

In order to obtain a dense mixture comprising the synthetic plastic concrete, it is preferable to inject the synthetic plastic resin in a liquid state at the bottom of the mold. To accomplish this, there is provided an inlet tube 91 around which is a clamp 92 fitted with a throttling screw 93. The tube is forced into an opening 94 which communicates between the exterior and the mold chamber 69 by way of a short extension 95 of the opening.

After the aggregate has been placed in the manner hereinabove described and the fixture 82 has been placed and secured, the synthetic plastic resinous material in liquid form is forced through the inlet tube 91 under sufficient pressure to drive it through the voids within the aggregate material in the mold chamber 69. Meanwhile, air previously filling the voids and the chamber finds its way out through the vent holes 99 and 90. When the liquid resinous material finally fills the voids and the chamber and begins to emerge through the vent holes, it will be apparent that the injection can be cut off, at which time the inlet tube 91 is closed off by manipulation of the screw 93 and the resinous material is given opportunity to set up and harden.

After the material has hardened sufficiently the mold is removed. This is accomplished by loosening the bolts 74 which hold clamps 71 and the closing ring in place permitting removal of the ring. Also bolts 65 are unscrewed and the mold can then be knocked loose from its position around the flange. Upon removal of the mold, the split insert ring 79 can be sprung loose and the molding operation is then complete. The hole 64 may be filled with grout or synthetic plastic material to finish off the spigot end of the pipe. It is clear also that by reason of the molding operation being carried on as described, the synthetic plastic or resinous material can be forced with any degree of pressure desired into the mold chamber which at the same time assures that it is forced into thorough contact not only with the interior of the mold but also into contact with the turns of prestressed wire 11 which lie within the mold chamber and into contact with the cylindrical surface of the core which actually forms one wall of the mold chamber. It is desirable to reduce bubbles and pockets to a minimum so that the entire flange structure will be impervious as will also be the area where the flange joins the core.

For producing a flange of relatively maximum density as well as to enhance the flow of the liquid synthetic plastic into the mold, it may on occasions be found desirable to draw a vacuum at the venting portion while the liquid material is being injected. Caution, however, must be exercised in making use of a vacuum to be certain that there are no leaks either around the packing ring 67 or the mold closing band 72 which, if present, might introduce bubbles in the flange and produce a condition which should be avoided. Use, however, of suitable materials for sealing around the edges of the mold chamber is sufficient to assure the creation of a suitable semi-vacuum condition in the chamber.

In actuality the molded flange serves a multiple purpose in that, being chip resistant and exceedingly strong, it protects the spigot end of the pipe from chipping and becoming broken as well as adding materially to the strength of the pipe at the spigot end. The character of the flange is also advantageous when the spigot end is forced into the bell end where the aligning problem is rendered less severe because of the nature of the synthetic plastic concrete comprising the flange.

Although the molding apparatus and method have been described primarily as applicable to prestressed molded concrete pipe cores, the same apparatus and substantially the same molding technique is applicable to a comparable degree with nonprestressed pipe cores, such as that illustrated in FIGURE 6 and with steel pipe, such as that illustrated in FIGURE 7. In all forms of the device it is helpful to coat the inside surfaces of the mold with a suitable conventional parting agent to prevent the resinous mix from adhering to the mold.

Figure 10:
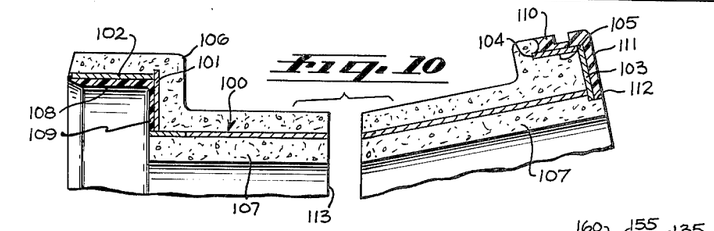
FIGURE 10 is a fragmentary longitudinal sectional view of a pipe section known as a "special" to which the invention has been applied.

A second form of the invention illustrated in FIGURE 10 shows an application of the invention to what are commonly known as "special sections." Special sections consist of Y's, T's and angular pieces which are often constructed to meet some special alignment of pipe in a trench. Very frequently special sections have to be made to specification to meet some infrequently encountered angular offset in the pipe line and so are rarely stocked as standard parts.

An embodiment of the invention suitable for use in the fabrication of special parts consists of what is initially a steel cylinder 100 having a flat annular section 101 welded to one end and carrying an annular sleeve 102 welded thereto to form the basic structure of the bell end of the pipe. At the opposite end an annular section 103 has a sleeve 104 welded thereto and providing therebeneath an annular pocket 105.

Customarily a coating 106 is applied to the exterior over the sleeve 102 at the bell end and extending into the pocket 105 at the spigot end as well as surrounding a portion of the exterior of the sleeve 104. An inside coating 107 is applied to the interior.

At the bell end a lining 108 of synthetic plastic concrete is applied to the interior of the sleeve 102 and a portion 109 of the lining extends over the outside face of the section 101. At the spigot end a flange 110 of the same synthetic plastic concrete is molded to the exterior of the sleeve 104 and a portion 111 of the same material extends over the exterior face of the section 103 until it abuts a shoulder 112 of the inside coating 107.

Ordinarily the special section is completed as described and then a cut 113 is made intermediate opposite ends cutting through the outside coating, the steel cylinder 100 and the inside coating 107. This cut may be actually a pie-shaped section, for example, which is cut out in two cuts and entirely removed and then opposite ends moved together with the axes of the opposite ends angularly disposed. The steel cylinder is then welded so as to join the opposite ends and Portland cement grout is sprayed around the weld so as to bring both the inside coating and the outside coating flush with the inside and outside surfaces respectively or, on occasions, some reinforcing mesh may be applied and a grout built up to a greater thickness, especially on the exterior.

It is of consequence to understand that the lining 108 of the bell end as well as the flange 110 at the spigot end may be applied prior to the cutting and welding or, if desired, application need not be made until after the welding and grouting has been completed.

In still another form of the invention illustrated in FIGURES 11, 12, 13 and 14 a different method of casting the flange on the spigot end is employed. This method contemplates a vertical disposition of the pipe core 10 and is preferably employed before the protective coating is applied over the prestressed wire 11. In the practice of this method a vertical mold, indicated generally by the reference character 116, is made use of, the mold comprising a bottom plate 117 and an annular side wall 118 on the outside. An anular inside wall 119 substantially higher than the outside wall 118 serves to establish an annular mold cavity. By providing a suitable draw with respect to both walls, ultimate removal of the mold is facilitated. A split insert ring 120 secured by an appropriate removable fastening means such as bolts provides a core for molding the required annular recess 26 for reception of the seal ring 28, as has been previously noted. A pair of vibrators 122, 123 balanced on diametrically opposite sides may be supplied with air under pressure from an air line 124, thereby to complete the mold set up.

Figure 11:
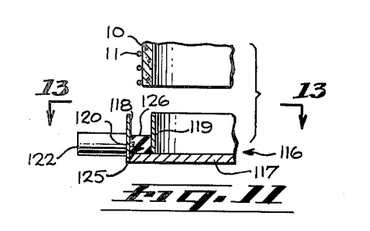
FIGURE 11 is a fragmentary vertical sectional view of a second form of mold showing an initial stage in the molding process.

In the employment of this form of the device a synthetic plastic concrete is mixed, including sand and the necessary hardening agent. The mold is initially filled with a mass 125 of the fluid concrete to a level 126 which is substantially below the top of the outside wall 118. Improved results have been experienced when the sand comprising the aggregate is heated before mixing. It is also good practice to set the vibrators in motion to level off the surface of the mass and to make certain that the interior of the mold is completely filled.

A satisfactory mix for the plastic concrete for all forms of the invention consists of one having four parts of 16 mesh sand, two parts of 30 mesh sand, two parts of epoxy resin, and one part of hardener. If desired, to this can be added milled asbestos fiber as an additional filler, the quantity of which will depend to a degree upon the character of the final product desired and also dependent upon temperature and other conditions.

Another satisfactory mixture consists of one consisting of six parts 16 mesh sand, three parts 30 mesh sand, two parts synthetic plastic resin and one part hardener. It is preferable to keep the coarser sand to the limits suggested and to avoid use of any real coarse aggregate in that the mixture needs to flow relatively freely in the practice of this form of the invention. It has further been found that sand warmed to about 100° F. adds a desirable amount of heat to the mixture when the ambient air temperature is from about 55° to 60°. For warmer air temperatures, warming of the sand may be dispensed with without sacrificing the free flow character of the mix. Warming of the mix, moreover, makes it possible to inject more filler such as the milled asbestos fiber, thereby to cut down to a greater degree the unsupported span of resinous material in the final product and to appreciably increase the strength.

Although some variation in the proportion of sand to the sylnthetic plastic thermosetting resin is permissible, it has been found that the proportion of sand to plastic should preferably not exceed 3 to 1 by weight. A lesser proportion of sand by as much as 10% by weight would still produce a dependable concrete material, but the amount of voids to be filled in such a mix should be taken carefully into consideration. The amount of diatomaceous earth, milled asbestos fiber or other flller should be calculated to effectively fill the voids in the coarser aggregate. Concretes of expressly desirable characteristics have been produced where the quantity of milled asbestos fiber has been kept within a range of from about 7½% to 15% by weight.

Figure 12:
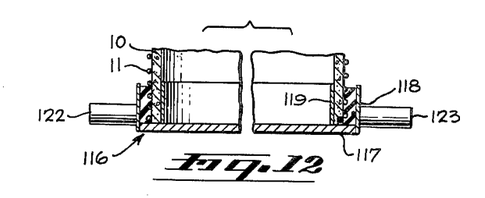
FIGURE 12 is a vertical sectional view of the mold of FIGURE 11 showing a subsequent step in the process.
Figure 13:
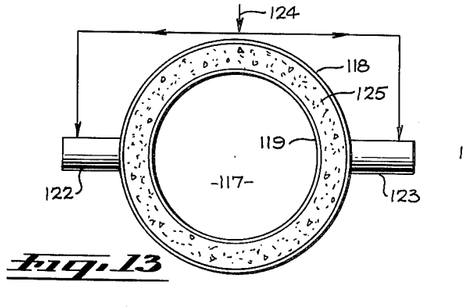
FIGURE 13 is a plan view of the mold of FIGURES 11 and 12.

While the mass is in a fluid state, the core 10 is lowered from the position shown in FIGURE 11 to the position shown in FIGURE 12. It will be understood that by suitable hoisting machinery the core can be upended and suspended as shown. It is preferable to continue vibration of the mass while the core is being lowered until it reaches the position of FIGURE 12. If there then be any low spots in the level 126, additional quantities of the synthetic plastic concrete can be added in order to level off the mold.

The core is permitted to rest in the mold in the position shown for a period sufficient to have the synthetic plastic resin set. After the synthetic plastic concrete has been set, the insert ring can be disengaged from the mold, the core elevated and the mold knocked loose, after which the insert ring, being a split ring, can be removed.

Figure 14:
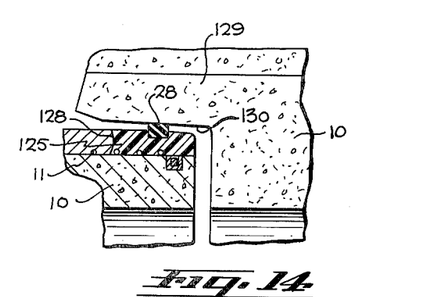
FIGURE 14 is a fragmentary longitudinal sectional view of the joint made up of the mold constructed as shown in FIGURES 11, 12 and 13.

After removal, a protective coating 127 is applied over the exterior of the core and the finished product at the spigot end will be substantially as shown in FIGURE 14. The slight curve 128 is due in part to adherence of the synthetic plastic concrete while still in a fluid state to the outside wall of the mold and to the exterior surface of the core 10. When the seal ring 28 is then applied to the annular recess formed by the insert ring 120, the spigot end is ready to be made up into a joint, as shown in FIGURE 14, with a bell end 129 of the core 10. It is often found advantageous to impart to an inside surface 130 of the bell end a taper of from 1 to 3 degrees flaring outwardly, thereby to improve the ease with which the joint is made up of the parts provided.

In still another form of the invention illustrated in FIGURES 15, 16, 17 and 18, a flange 135 is precast and subsequently applied to the core 10 having the prestressed windings 11 of the usual kind thereon. In order to employ this form of the invention, a mold indicated generally by the reference character 136 is employed. These molds may be made use of in batches so that a number can be made use of simultaneously. The molds are also compact and can be used under controlled conditions and in a fashion such that substantial numbers of flanges can be stock piled.

Figures 15, 16, 18:
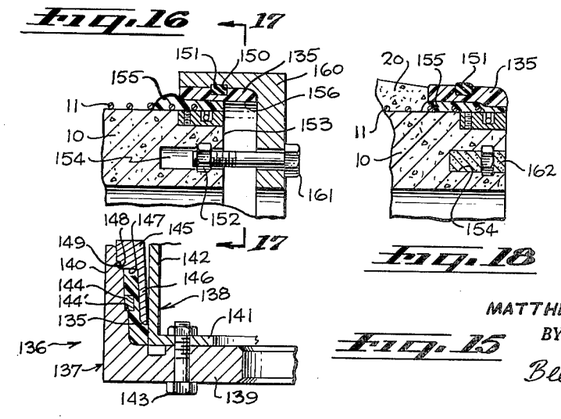
FIGURE 15 is a fragmentary longitudinal sectional view of a mold for precasting flanges for use on molded concrete pipe.
FIGURE 16 is a fragmentary longitudinal sectional view of the precast mold being applied to a pipe section.
FIGURE 18 is a fragmentary longitudinal sectional view of the spigot end of a pipe with the precast mold applied in place.
Figure 17:
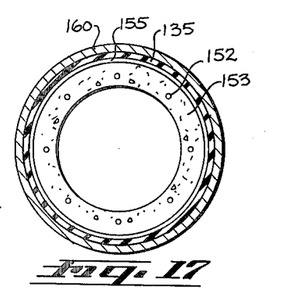
FIGURE 17 is a cross-sectional view taken on the line 17—17 of FIGURE 16.

As shown the mold consists of an outer mold member 137 and an inner mold member 138. The outer mold member has an annular bottom wall 139 and an annular side wall 140. Similarly the inner mold member has an annular bottom wall 141 and an annular side wall 142. Bolts 143 secure the bottom wall 141 to the bottom wall 139 so that a chamber or space is provided between the interior of the side wall 140 and the exterior of the side wall 142. A split insert ring 144 rests upon a shoulder 144' to keep it in place.

In making use of this form of the invention comprising the mold 136, a mass of the synthetic plastic concrete in fluid form of the type previously described is placed between the side walls 140 and 142, partially filling the space. Thereafter a forming sleeve 145 is pressed into the space so that a skirt 146 slides downwardly along the outside surface of the wall 142 and until a shoulder 147 on the sleeve engages a shoulder 148 on the inside surface of the side wall 140.

Cut-outs, one of which is shown at 149, are provided to permit excess synthetic plastic concrete material to flow outwardly as the forming sleeve is pressed into the position shown in FIGURE 15. Once in position the synthetic concrete is permitted to harden in the usual fashion. Following this the mold members are unbolted, the forming sleeve 145 is removed, and the flange 135 can then be extracted together with the insert ring. The insert ring is then removed from the molded flange to provide the appropriate annular recess 150 for reception of a seal ring 151.

When this form of the invention is to be employed, nuts 152 are cast in the core 10 adjacent an end face 153 and a pocket 154 is cored inwardly of the nut. In order to apply the flange to the pipe core, a mass 155 of synthetic plastic resin, preferably of a type commonly known as epoxy resin, is mixed to a buttery or mortar-like consistency with an appropriate hardener and spread around the exterior of the end of the core 10. If desired, sand or other fine aggregate may be added, together with an appropriate filler such as short fiber asbestos. The flange 135 is then started over the end so that a flared inside surface 156 of the flange begins engagement with the mass 155.

Since a snug, firm fit is desired, a pulling ring 160 is made use of. The pulling ring is formed on the interior so that it fits relatively snugly around the precast flange and bolts 161 engaging nuts 152 are used to draw the pulling ring 160 toward the end face of the core until the flange 135 is pressed into the position shown in FIGURE 18. With the interior surface 156 of the flange being made slightly greater than the outer circumference of the wire 11 and because of the flared character of the surface, the mass 155 will be compacted between the surface 156 and the exterior of the pipe core in order to make a solid adhesive layer.

Once the adhesive layer has hardened adequately, the bolts 161 are removed, together with the pulling ring and the core with the flange attached is then ready for application of the usual coating 20. The pocket 154 may then be filled with grout or a plug of epoxy 162 and the annular seal ring 151 applied. The spigot end of the pipe is thus completed and the pipe is ready for use.

By precasting flanges in the manner described and subsequently applying them to the prestressed concrete pipe cores, fabrication of the flanges is subject to good control in that the molding equipment is capable of being compact and used under controlled conditions to a very adequate degree. The flanges are such that any number can be made in advance and inventoried, ready for application whenever needed. Moreover, inside tolerances need not be held particularly close because of the character of the mass 155 being such that it fuses very tenaciously with the exterior of the core and the interior of the flange to make an integral mass, whether a tight fit or a loose fit is encountered. The exterior dimensions of the flange can be very carefully controlled, thereby to add to the assurance that the spigot end will be capable of being made into a dependable joint.

While the invention has herein been shown and described in what is conceived to be the most practical and preferred embodiment, it is recognized that departures may be made therefrom within the scope of the invention, which is not to be limited to the details disclosed herein but is to be accorded the full scope of the claims so as to embrace any and all equivalent devices.

Having described the invention, what is claimed as new in support of Letters Patent is:

1. A concrete pipe of composite construction comprising a concrete core having an outside cylindrical surface, an end having a transverse end face, an anchor lug in the outside cylindrical surface at a location adjacent the transverse end face and a length of wire extending from the anchor lug spirally under prestress tension around the outside cylindrical surface, a flange on said end comprising a thermosetting synthetic plastic and aggregate mixture, said mixture comprising an adhesive substance which is fluid during application to the core and which after having set remains as a solid substantially nondeformable material, said flange having turns of said wire adjacent the end, the wire and the respective anchor lug being embedded in said flange.

2. A concrete pipe of composite construction comprising a concrete core having an outside cylindrical surface, an end having a transverse end face, an anchor lug in the outside cylindrical surface at a location adjoining the transverse end face and a length of wire extending from the anchor lug spirally under prestress tension around the outside cylindrical surface, a flange on said end comprising a mixture of aggregate and a thermosetting synthetic plastic molded in place on said end, said flange being substantially nondeformable when subject to pressures encountered during use, said flange having turns of said wire adjacent the end and the respective anchor lug embedded in said flange, said flange having an annular recess in an exposed outer surface at a location intermediate opposite edges thereof and an annular seal ring of resilient material in said annular recess extending radially outwardly of the outermost surface of said flange, said seal ring being deformable when subject to pressures encountered during use.

3. A prestressed concrete pipe of composite construction comprising a concrete core having an outside cylindrical surface, an inside cylindrical surface, a spigot end having a transverse end face and a bell end, an anchor lug on the exterior of the bell end, an anchor lug in the outside cylindrical surface of the spigot end at a location adjoining the transverse end face and a length of wire extending from one anchor lug spirally under prestress tension around the outside cylindrical surface to the other anchor lug, a flange on the spigot end comprising a mixture of aggregate and a synthetic plastic epoxy resin molded in place on the spigot end, said flange being substantially nondeformable when subject to pressures encountered during use, said flange having turns of said wire adjacent the spigot end and the respective anchor lug embedded in said flange and said flange being substantially flush with said transverse end face and having a maximum outside diameter less than the inside diameter of the bell end, said flange having an annular recess in an exposed outer surface at a location intermediate opposite edges thereof, and an annular seal ring of resilient material in said annular recess having an outside surface extending beyond the outer surface of the flange and being deformable when subject to pressures encountered during use.

4. A bell and spigot joint for prestressed concrete pipe comprising a core, a spigot end on said core having a spigot end face, prestress wire wound over said core to a location adjacent said end face and anchored thereto, a flange of a mixture of synthetic plastic resin and aggregate molded upon the spigot end and embedding endmost turns of said prestress wire therein, the resin of said flange during molding being in fluid condition and in intimate contact with substantially all portions of the adjacent exterior portions of said spigot end and said endmost turns and when in final form being substantially hard and nondeformable, said flange having an annular recess in the exterior circumference and an annular seal ring of resilient material in said annular recess, a bell end on a second concrete core having an annular cylindrical interior surface spaced from the exterior surface of said flange and an annular shoulder spaced inwardly of said bell end, the interior surface of said bell being in sealed engagement with said seal ring.

5. A bell and spigot joint for prestressed concrete pipe comprising concrete core, a spigot end on said core having a spigot end face, prestress wire wound over said core to a location adjacent said end face and anchored thereto, a flange of a mixture of synthetic plastic resin and aggregate molded upon the spigot end of the core and embedding endmost turns of said prestress wire therein, said flange having an annular recess in the exterior circumference intermediate opposite sides and an annular seal ring of resilient deformable material in said annular recess, a bell end on a second concrete core and having an annular cylindrical interior surface spaced from the exterior circumference of said flange, an annular shoulder spaced inwardly of said bell end, and an annular bell liner of a mixture of synthetic plastic resin and aggregate extending between said shoulder and the outside end of said bell, an inside circumferential surface of said liner being in sealed engagement with said seal ring, resinous material of said flange and said liner during molding being in fluid condition and in intimate adhesive contact with adjacent respective portions of said spigot end and the interior surface of said bell end and when in final form being hard and substantially nondeformable under pressures encountered during use.

6. A pipe of composite construction comprising a core of hard substantially nondeformable material having an outside cylindrical surface and an end having a transverse end face, a flange on said end comprising a synthetic plastic molded concrete mixture in place on said end, said mixture comprising from about two to three parts of a dense sand mixture and about one part of synthetic thermosetting plastic resin, said flange being of hard substantially nondeformable consistency and located adjacent said transverse end face and in adhesive engagement with the material of the pipe with a bond comparable to the strength of the flange itself and impervious to penetration.

7. A pipe of composite construction comprising a core of hard substantially nondeformable material having an outside cylindrical surface, an end having a transverse end face, a flange on said end comprising a synthetic plastic molded concrete mixture in place on said end, said mixture comprising from about four to six parts of relatively coarse sand, from about two to three parts of relatively fine sand, a quantity of filler of fineness less than the relatively fine sand substantially filling the voids in the sand, and about one part of a synthetic thermosetting plastic resin, said flange when set and cured being of hard substantially nondeformable consistency and located adjacent said transverse end face and in adhesive engagement with the material of the pipe with a bond comparable to the strength of the flange itself and impervious to penetration.

8. A pipe of composite construction comprising a core of hard substantially nondeformable material having an outside cylindrical surface, an end having a transverse end face, a flange on said end comprising a synthetic plastic molded concrete mixture in place on said end, said mixture comprising a dense sand mixture and synthetic thermosetting plastic resin, said flange being of hard substantially nondeformable consistency and located adjacent said transverse end face and in adhesive engagement with the material of the pipe with a bond comparable to the strength of the flange itself and impervious to penetration, multiple turns of prestress wire surrounding the core, one end of the wire being anchored in the core beneath the flange and adjacent the respective end of the core.

References Cited by the Examiner

UNITED STATES PATENTS

| | | |
|---|---|---|
| 2,537,659 | 1/1951 | Eisner et al. |
| 2,707,003 | 4/1955 | Kennison. |
| 2,770,476 | 11/1956 | Clerety. |
| 2,955,322 | 10/1960 | Hite _____________ 285—288 X |
| 2,986,411 | 5/1961 | Anderson. |
| 2,996,317 | 8/1961 | Kibbie. |
| 3,054,627 | 9/1962 | Ligon. |
| 3,073,609 | 1/1963 | Hamilton ________ 277—207 X |
| 3,135,519 | 6/1964 | Ligon et al. |

LAVERNE D. GEIGER, *Primary Examiner.*

EDWARD V. BENHAM, LEWIS J. LENNY, *Examiners.*